United States Patent
Urabe et al.

(10) Patent No.: US 11,410,343 B2
(45) Date of Patent: Aug. 9, 2022

(54) INFORMATION PROCESSING APPARATUS, INFORMATION PROCESSING METHOD, AND NON-TRANSITORY COMPUTER READABLE MEDIUM

(71) Applicant: CANON KABUSHIKI KAISHA, Tokyo (JP)

(72) Inventors: Hirofumi Urabe, Tokyo (JP); Masahiro Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 16/821,319

(22) Filed: Mar. 17, 2020

(65) Prior Publication Data
US 2020/0302659 A1 Sep. 24, 2020

(30) Foreign Application Priority Data
Mar. 19, 2019 (JP) .............................. JP2019-051578

(51) Int. Cl.
*G06T 11/20* (2006.01)
*G06T 11/00* (2006.01)
*G06T 5/00* (2006.01)
*G06T 5/40* (2006.01)

(52) U.S. Cl.
CPC ............ *G06T 11/001* (2013.01); *G06T 5/009* (2013.01); *G06T 5/40* (2013.01); *G06T 11/206* (2013.01); *G06T 2207/10024* (2013.01); *G06T 2207/20208* (2013.01)

(58) Field of Classification Search
None
See application file for complete search history.

(56) References Cited

U.S. PATENT DOCUMENTS

| 10,237,488 | B2 | 3/2019 | Yokoya | |
|---|---|---|---|---|
| 2013/0170540 | A1* | 7/2013 | Damkat | H04N 19/154 375/240.01 |
| 2017/0086659 | A1* | 3/2017 | Uchiyama | G06V 10/60 |
| 2018/0204500 | A1* | 7/2018 | Li | G09G 3/2007 |

(Continued)

FOREIGN PATENT DOCUMENTS

| JP | 2007-266680 A | 10/2007 |
|---|---|---|
| JP | 2015-232478 A | 12/2015 |

(Continued)

OTHER PUBLICATIONS

The above foreign patent document was cited in the Mar. 30, 2021 Japanese Office Action, that issued in Japanese Patent Application No. 2019-051578.

*Primary Examiner* — Yanna Wu
(74) *Attorney, Agent, or Firm* — Cowan, Liebowitz & Latman, P.C.

(57) ABSTRACT

An information processing apparatus according to the present invention includes at least one memory and at least one processor which function as: an acquiring unit configured to acquire information related to a brightness level of each pixel in an image; a determining unit configured to determine, on a basis of the information, a ratio of a number of corresponding pixels in the image with respect to at least one of Standard Dynamic Range (SDR) and a brightness range obtained by excluding SDR from High Dynamic Range (HDR); and an outputting unit configured to output the ratio.

15 Claims, 8 Drawing Sheets

(56) References Cited

U.S. PATENT DOCUMENTS

2018/0296168 A1* 10/2018 Rice ..................... A61B 5/0261
2019/0075229 A1*  3/2019 Kamiya ................... H04N 5/20
2019/0295504 A1*  9/2019 Xiong ..................... G09G 5/10

FOREIGN PATENT DOCUMENTS

| JP | 2017-028490 A | 2/2017 |
| JP | 2017-123575 A | 7/2017 |
| JP | 2017-219802 A | 12/2017 |

\* cited by examiner

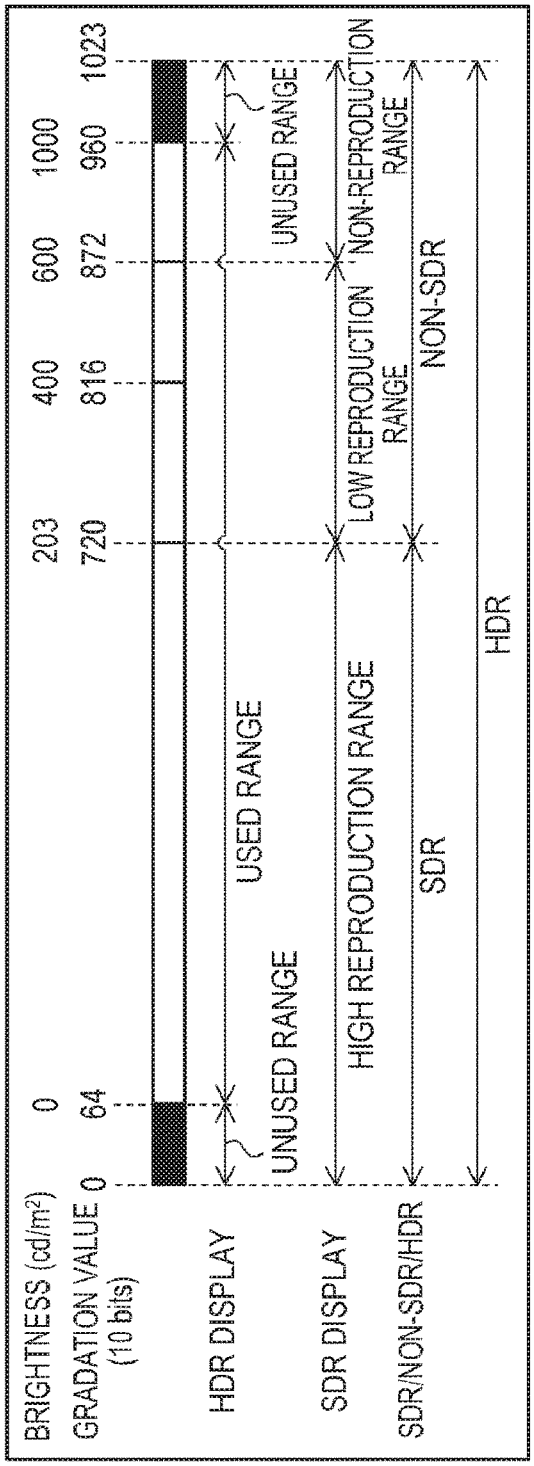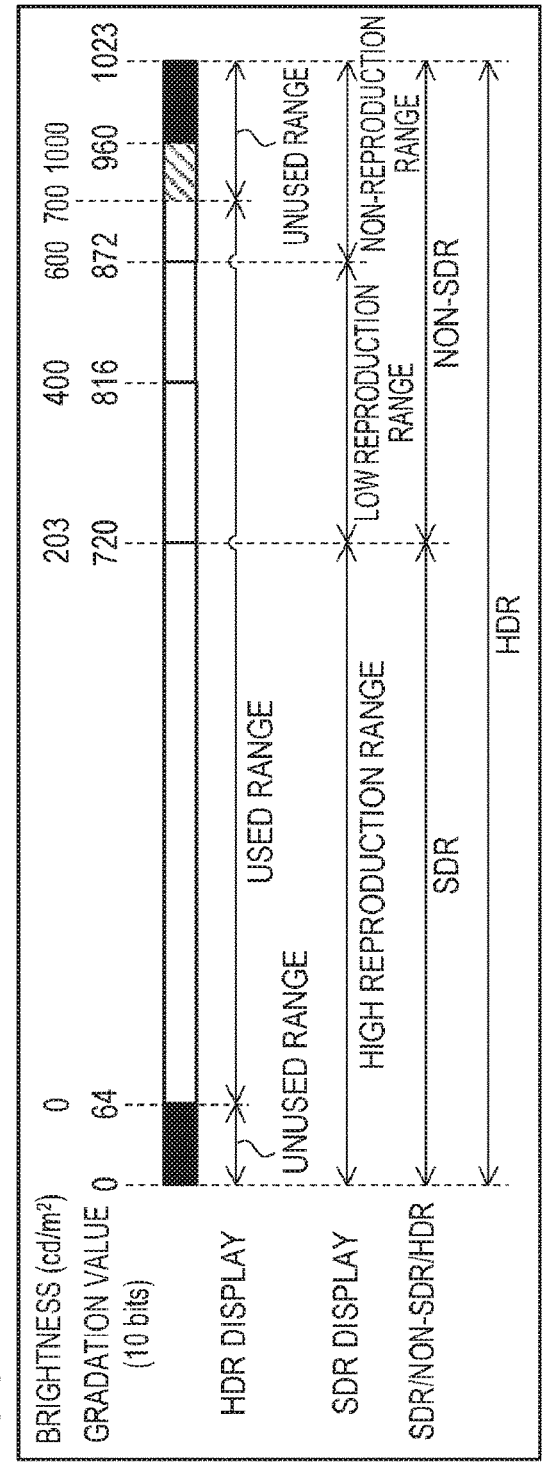

FIG. 4A

SDR: 70%
HDR: 30%
 SDR CONVERSION COMPRESSION (203~600): 25%
 SDR CONVERSION CLIPPING (600~): 5%

FIG. 4B

SDR: 70%
HDR: 30%
 203~400: 15%
 400~600: 8%
 600~800: 5%
 600~1000: 2%

FIG. 4C

SDR: 70%
HDR: 30%

| SETTING ITEM | SETTING INFORMATION |
|---|---|
| RATIO DISPLAY | ON / OFF |
| RATIO DISPLAY TYPE | HDR/SDR CONVERSION / FALSE COLOR / HDR/SDR RATIO |
| HDR/SDR BORDER | AUTOMATIC / 100~203 cd/m² |

| GRADATION VALUE | NUMBER OF PIXELS | BRIGHTNESS [cd/m2] |
|---|---|---|
| 1023 | 0 | 1000 |
| 1022 | 0 | 1000 |
| ... | 0 | ... |
| 940 | 1036800 | 1000 |
| ... | 0 | ... |
| 64 | 1036800 | 0 |
| ... | 0 | ... |
| 0 | 0 | 0 |

INFORMATION PROCESSING APPARATUS, INFORMATION PROCESSING METHOD, AND NON-TRANSITORY COMPUTER READABLE MEDIUM

BACKGROUND OF THE INVENTION

Field of the Invention

The present invention relates to an information processing apparatus, an information processing method, and a non-transitory computer readable medium.

Description of the Related Art

Various standards such as Perceptual Quantizer (PQ) and Hybrid Log-Gamma (HLG) are proposed as standards of image data corresponding to a wide dynamic range (a wide brightness range). The wide dynamic range is referred to as "High Dynamic Range (HDR)" and the like. Meanwhile, a conventional dynamic range (a dynamic range that is narrower than HDR) is referred to as "Standard Dynamic Range (SDR)" and the like. Using each brightness of HDR enables a broad range of image representations from extremely dark parts to extremely light parts to be realized. In addition, a combined use of HDR and SDR, a conversion from HDR to SDR, and the like are performed for the purposes of broadcasting, in SDR, an image (an image content) photographed in HDR. An image having HDR is referred to as an "HDR image" or the like, and image data representing an HDR image is referred to as "HDR image data" or the like. In a similar manner, an image having SDR is referred to as an "SDR image" or the like, and image data representing an SDR image is referred to as "SDR image data" or the like.

An example of a standard of HDR image data is HDR10 formulated by the Consumer Technology Association (CTA). In HDR10, a peak brightness (a maximum brightness) and a maximum frame average brightness in an entire moving image content (moving image) are defined as metadata (static metadata). The maximum frame average brightness represents a maximum brightness among a plurality of frame average brightnesses respectively corresponding to a plurality of frames (average brightnesses of images (frame images) corresponding to frames).

Another example of a standard of HDR image data is ST 2094-40 formulated by the Society of Motion Picture and Television Engineers (SMPTE). In ST 2094-40, a peak brightness and a maximum frame average brightness for each partial period of a moving image are defined as metadata (dynamic metadata). Specifically, a peak brightness and a maximum frame average brightness for each scene or each frame of the moving image are defined as dynamic metadata.

Another example of a standard of HDR image data is BT.2408-1 Operational practices in HDR television production formulated by the International Telecommunication Union (ITU). Hereinafter, this standard will be described as "BT.2408-1". BT.2408-1 describes the use of a combination of HDR and SDR. Specifically, BT.2408-1 describes that an average brightness in HDR should be managed not to become excessively high. Reference White in HLG should be set to approximately 200 cd/m$^2$, and the like. Reference White corresponds to white in SDR Another example of a standard of HDR image data is BT.2390-4 High dynamic range television for production and international programme exchange formulated by the ITU. Hereinafter, this standard will be described as "BT.2390-4". BT.2390-4 describes a conversion from HDR to SDR Various methods are used for the conversion from HDR to SDR including a method of not compressing a part (for example, a brightness range of 0 to 100 cd/m$^2$) but compressing other parts of HDR and a method of compressing the entire HDR.

Another example of a standard of HDR image data is DisplayHDR formulated by Video Electronics Standards Association (VESA). In DisplayHDR, "DisplayHDR 400" is specified as a display apparatus capable of performing high brightness display of 400 cd/m$^2$ and "DisplayHDR 600" is specified as a display apparatus capable of performing high brightness display of 600 cd/m$^2$. Furthermore, "DisplayHDR 1000" is specified as a display apparatus capable of performing high brightness display of 1000 cd/m$^2$. As described above, display apparatuses that display HDR images use various display brightnesses.

In addition, in HDR image production, a brightness histogram display function, a waveform monitor display function, a false color display function, and the like are used as assist functions for confirming a brightness distribution of an image.

Japanese Patent Application Laid-open No. 2007-266680 discloses a technique for displaying a ratio of an area (number of pixels) of blocked-up shadows and a ratio of an area (number of pixels) of blown-out highlights.

In HDR image production, brightness of an HDR image must be managed to prevent the HDR image from becoming too bright and to ensure that the HDR image is converted into an SDR image with suitable image quality. For example, a user must assess a ratio of the number of pixels corresponding to a brightness range that constitutes a part of HDR in an HDR image to manage the brightness of the HDR image.

According to the technique disclosed in Japanese Patent Application Laid-open No. 2007-266680, the ratio of an area (number of pixels) of blocked-up shadows and the ratio of an area (number of pixels) of blown-out highlights can be readily (intuitively) assessed. However, even when using the technique disclosed in Japanese Patent Application Laid-open No. 2007-266680, a user cannot readily (intuitively) assess a ratio of the number of pixels corresponding to a brightness range which constitutes a part of HDR and which includes a plurality of brightnesses (brightness levels) and cannot sufficiently manage the brightness of an HDR image. In other words, the user cannot readily (intuitively) assess a ratio of an area including pixels that are neither blocked-up shadows nor blown-out highlights.

SUMMARY OF THE INVENTION

The present invention provides a technique that enables a user to readily (intuitively) assess a ratio of the number of pixels corresponding to a brightness range which constitutes a part of HDR and which includes a plurality of brightness levels.

The present invention in its first aspect provides an information processing apparatus comprising at least one memory and at least one processor which function as:

an acquiring unit configured to acquire information related to a brightness level of each pixel in an image;

a determining unit configured to determine, on a basis of the information, a ratio of a number of corresponding pixels in the image with respect to at least one of Standard Dynamic Range (SDR) and a brightness range obtained by excluding SDR from High Dynamic Range (HDR); and an outputting unit configured to output the ratio.

The present invention in its second aspect provides an information processing apparatus comprising at least one memory and at least one processor which function as:
an image processing unit configured to generate data of a processed image by processing data of an input image;
a graphic generating unit configured to generate data of a graphic image related to the data of the input image; and
a display control unit configured to display the processed image and the graphic image, wherein
the graphic image is a graph or a histogram having an axis indicating a brightness level, and
in a case where a false color display function is enabled,
the image processing unit applies conversion colors to the input image on a basis of a predetermined relationship between a plurality of brightness ranges and a plurality of conversion colors, and
the graphic generating unit applies conversion colors to the graphic image on a basis of the predetermined relationship.

The present invention in its third aspect provides an information processing method comprising:
acquiring information related to a brightness level of each pixel in an image:
determining, on a basis of the information, a ratio of a number of corresponding pixels in the image with respect to at least one of Standard Dynamic Range (SDR) and a brightness range obtained by excluding SDR from High Dynamic Range (HDR); and
outputting the ratio.

The present invention in its fourth aspect provides an information processing method comprising:
an image processing step of generating data of a processed image by processing data of an input image:
a graphic generating step of generating data of a graphic image related to the data of the input image; and
a display control step of displaying the processed image and the graphic image, wherein
the graphic image is a graph or a histogram having an axis indicating a brightness level, and
in a case where a false color display function is enabled,
in the image processing step, conversion colors are applied to the input image on a basis of a predetermined relationship between a plurality of brightness ranges and a plurality of conversion colors, and
in the graphic generating step, conversion colors are applied to the graphic image on a basis of the predetermined relationship.

The present invention in its fifth aspect provides a non-transitory computer readable medium that stores a program, wherein
the program causes a computer to execute an information processing method comprising:
acquiring information related to a brightness level of each pixel in an image;
determining, on a basis of the information, a ratio of a number of corresponding pixels in the image with respect to at least one of Standard Dynamic Range (SDR) and a brightness range obtained by excluding SDR from High Dynamic Range (HDR); and
outputting the ratio.

The present invention in its sixth aspect provides a non-transitory computer readable medium that stores a program, wherein
the program causes a computer to execute an information processing method comprising:
an image processing step of generating data of a processed image by processing data of an input image:
a graphic generating step of generating data of a graphic image related to the data of the input image; and
a display control step of displaying the processed image and the graphic image,
the graphic image is a graph or a histogram having an axis indicating a brightness level, and
in a case where a false color display function is enabled,
in the image processing step, conversion colors are applied to the input image on a basis of a predetermined relationship between a plurality of brightness ranges and a plurality of conversion colors, and
in the graphic generating step, conversion colors are applied to the graphic image on a basis of the predetermined relationship.

Further features of the present invention will become apparent from the following description of exemplary embodiments with reference to the attached drawings.

BRIEF DESCRIPTION OF THE DRAWINGS

FIGS. 3A and 3B are diagrams showing an example of a brightness range according to the present embodiment;
FIGS. 4A to 4C are diagrams showing an example of a graphic image according to the present embodiment.

DESCRIPTION OF THE EMBODIMENTS

An embodiment of the present invention will be described below. While an example in which an information processing apparatus according to the present embodiment is built into a display apparatus will be described, the information processing apparatus according to the present embodiment may be an apparatus (such as a personal computer) separate from the display apparatus or the information processing apparatus according to the present embodiment may be built into a reproducing apparatus or an image capturing apparatus.

Figure 1:
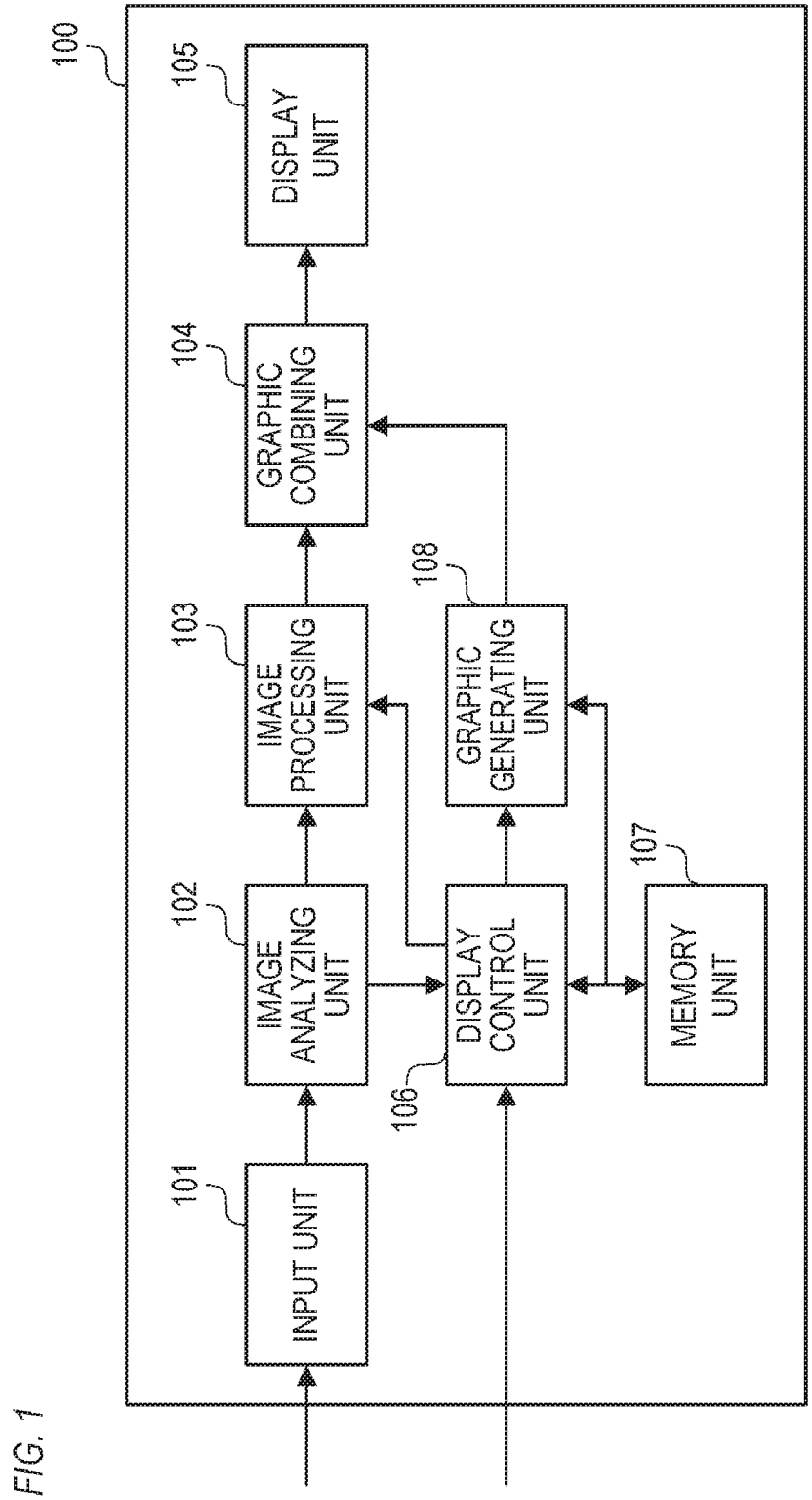
FIG. 1 is a block diagram showing a configuration example of a display apparatus according to an embodiment.

FIG. 1 is a block diagram showing a configuration example of a display apparatus according to the present embodiment. A display apparatus 100 shown in FIG. 1 has an input unit 101, an image analyzing unit 102, an image processing unit 103, a graphic combining unit 104, a display unit 105, a display control unit 106, a memory unit 107, and a graphic generating unit 108.

The input unit 101 acquires object moving image data and outputs the object moving image data to the image analyzing unit 102. For example, the object moving image data is moving image data in compliance with HDR10, HDR10+, Perceptual Quantizer (PQ), Hybrid Log-Gamma (HLG), or the like and represents a moving image (a moving image content). A wide dynamic range defined by Perceptual Quantizer (PQ), Hybrid Log-Gamma (HLG), or the like is referred to as "High Dynamic Range (HDR)" and the like. Meanwhile, a dynamic range (a dynamic range that is narrower than HDR) defined by Gamma 2.2 or the like is referred to as "(SDR) Standard Dynamic Range" and the like. An image (a moving image; a still image) having HDR is referred to as an "HDR image (an HDR moving image; an HDR still image)" or the like, and image data representing an HDR image (an HDR moving image; an HDR still image) is referred to as "HDR image data (HDR moving image data; HDR still image data)" or the like. In a similar manner, an image (a moving image; a still image) having SDR is referred to as an "SDR image (an SDR moving image; an SDR still image)" or the like, and image data representing an SDR image (an SDR moving image; an SDR still image) is referred to as "SDR image data (SDR moving image data; SDR still image data)" or the like. In the present embodiment, HDR moving image data (moving image data corresponding to HDR) is acquired as object moving image data.

Specifically, the input unit 101 acquires, for each frame of an object moving image (a moving image represented by the object moving image data), frame image data (image data representing an image (a frame image) corresponding to the frame) from an external apparatus. In addition, the input unit 101 outputs the acquired object frame image data to the image analyzing unit 102. For example, the input unit 101 is an input terminal in compliance with a standard such as Serial Digital Interface (SDI) or High-Definition Multimedia Interface (HDMI). The external apparatus is an image capturing apparatus, a reproducing apparatus, or the like.

Alternatively, the display apparatus 100 may have a storage unit for storing moving image data and the input unit 101 may acquire moving image data recorded in the storage unit as object moving image data from the storage unit. The object moving image data may be SDR moving image data (moving image data corresponding to SDR) in compliance with Gamma 2.2 or the like. The image data (data of an input image) acquired by the input unit 101 may be still image data instead of moving image data.

The image analyzing unit 102 acquires the object moving image data output from the input unit 101, analyzes the object moving image data, outputs an analysis result to the display control unit 106, and outputs the object moving image data to the image processing unit 103.

Specifically, the image analyzing unit 102 analyzes the object moving image data and acquires pixel information related to a brightness (an absolute brightness; a brightness level) of each pixel at each time position (each frame) of the object moving image as an analysis result. In the present embodiment, the image analyzing unit 102 analyzes frame image data output from the input unit 101. The pixel information indicates, with respect to each of a plurality of gradation values assumable by the frame image data output from the input unit 101, the number of pixels present in a frame image represented by the frame image data. When the gradation value of the frame image data is a 10 bit-value (0 to 1023), the pixel information indicates the number of pixels present with respect to each of 0 to 1023.

Furthermore, the image analyzing unit 102 acquires metadata corresponding to the object moving image data from the object moving image data and outputs the acquired metadata to the display control unit 106 as an analysis result. For example, the metadata is data stored in an InfoFrame specified in HDMI, ANC (Ancillary) data stored in a blanking region specified in SDI, or the like.

The image processing unit 103 generates processed moving image data (data of a processed image) by performing image processing on the object moving image data output from the image analyzing unit 102. In addition, the image processing unit 103 outputs the processed moving image data to the graphic combining unit 104.

Specifically, a gradation curve (a correspondence relationship between a gradation value and a brightness; gradation characteristics; a transfer function) is set from the display control unit 106 to the image processing unit 103. A gradation curve of HLG, PQ, or the like is set on the basis of a user operation or metadata in order to display (process) an HDR image. A gradation curve of Gamma 2.2 or the like is set on the basis of a user operation or metadata in order to display (process) an SDR image. A gradation range such as a limited range, a full range, or the like is also set from the display control unit 106 to the image processing unit 103. The limited range and the full range are gradation ranges to which a set brightness range (a brightness range of HLG, PQ, or the like; an original range) is to be assigned. The limited range is a part of a range of gradation values assumable by the object moving image data, and the full range is the entire range of gradation values assumable by the object moving image data. The image processing unit 103 converts each gradation value of the object moving image data in accordance with the set gradation curve, the set gradation range, and the like (a gradation conversion process).

The display control unit 106 can also set to the image processing unit 103, on the basis of a user operation, at least a part of a brightness range (an original range) of HLG PQ, or the like as a brightness range (an HDR range) to be used in HDR display (display in HDR). In accordance with the set HDR range, the image processing unit 103 converts each gradation value of the object moving image data so that a gradation value corresponding to a brightness in the original range is converted into a gradation value corresponding to a brightness in the HDR range (a mapping process). Let us now consider a case where HLG is set, the original range is a brightness range of 0 to 1000 cd/m$^2$, and an HDR range of 0 to 600 cd/m$^2$ is set. In this case, gradation values in the brightness range of 0 to 600 cd/m$^2$ are not converted but gradation values corresponding to brightnesses higher than 600 cd/m$^2$ are converted into a gradation value corresponding to 600 cd/m$^2$ (an upper limit brightness) (a clipping process).

Figure 2:
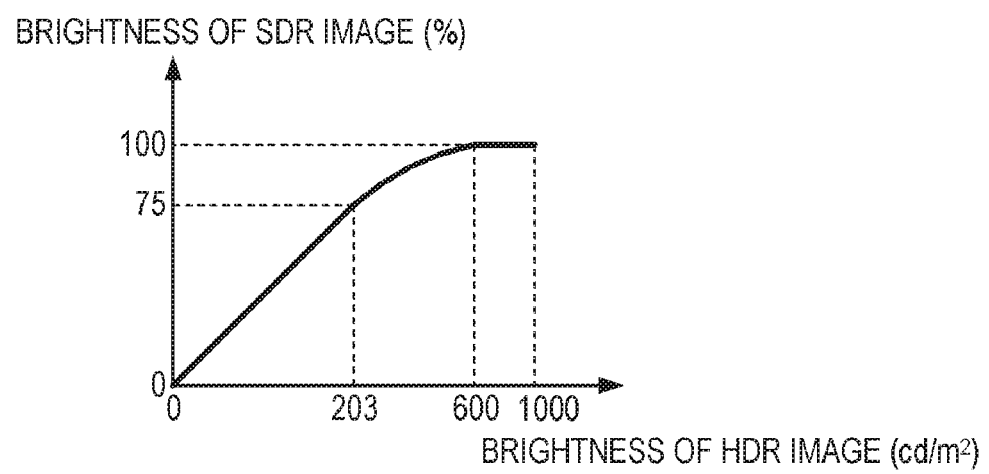
FIG. 2 is a diagram showing an example of HDR/SDR conversion according to the present embodiment.

The display control unit 106 can also set execution of HDR/SDR conversion (a gradation conversion process of converting an HDR image into an SDR image; a range conversion process of converting a dynamic range of an HDR image) to the image processing unit 103. FIG. 2 shows an example of HDR/SDR conversion according to the present embodiment. FIG. 2 represents an example of HDR/SDR conversion that converts an HDR image of which a dynamic range is an HLG brightness range (0 to 1000 cd/m$^2$) into an SDR image. In FIG. 2, an HDR brightness range of 0 to 203 cd/m$^2$ is converted into an SDR brightness range of 0 to 75%, and an HDR brightness range of 203 to 600 cd/m$^2$ is converted into an SDR brightness range of 75 to 100%. In addition, brightness of HDR of 600 to 1000 cd/m$^2$ is converted into brightness of SDR of 100% (a clipping process). It should be noted that brightnesses (boundary brightnesses) that constitute boundaries of the brightness ranges may be automatically set in accordance with a gradation curve or may be manually set by a user operation.

Alternatively, a correspondence relationship of HDR/SDR conversion may be arbitrarily set by a 1D LUT. In this case, since the gradation curve is that of HLG, the display control unit 106 automatically sets the boundary brightnesses to 203 cd/m$^2$ and 600 cd/m$^2$.

According to the HDR/SDR conversion shown in FIG. 2, an area having a brightness of 0 to 203 cd/m$^2$ in the HDR image becomes an area with a high gradation property (an area with a high degree of reproducibility of the HDR image; for example, an area having a same brightness as the HDR image) in the SDR image. Therefore, in the present embodiment, the brightness range of 0 to 203 cd/m$^2$ (the brightness range in which the degree of reproducibility of the HDR image increases in the SDR image) will be described as a "high reproduction range". An area having a brightness of 203 to 600 cd/m$^2$ becomes an area with a gradation property that is low (an area where the HDR image is reproduced but at a low degree of reproducibility) in the SDR image. Therefore, in the present embodiment, the brightness range of 203 to 600 cd/m$^2$ (the brightness range in which the HDR image is reproduced but the degree of reproducibility decreases in the SDR image) will be described as a "low reproduction range". In addition, an area having brightness of 600 to 1000 cd/m$^2$ becomes an area with no gradation property (an area where the HDR image is not reproduced; an area of blocked-up shadows or blown-out highlights) in the SDR image. Therefore, in the present embodiment, the brightness range of 600 to 1000 cd/m$^2$ (the brightness range in which the HDR image is no longer reproduced in the SDR image) will be described as a "non-reproduction range".

When a ratio of the number of pixels not corresponding to the high reproduction range in the HDR image (a ratio of the number of pixels not corresponding to the high reproduction range to the total number of pixels in the HDR image) is excessively high, an SDR image with low (inferior) image quality is obtained by the HDR/SDR conversion. Pixels not corresponding to the high reproduction range are pixels having a brightness in the low reproduction range or the non-reproduction range among the plurality of pixels of the HDR image. When a ratio of the number of pixels corresponding to the non-reproduction range (the number of pixels having a brightness in the non-reproduction range) is excessively high, a significant image quality deterioration due to the HDR/SDR conversion occurs.

FIGS. 3A and 3B show an example of various brightness ranges of an HDR image.

FIG. 3A shows an example of a case where a gradation value of the HDR image is a 10-bit value (0 to 1023), HLG (an original range of 0 to 1000 cd/m$^2$) is set, and a limited range of 64 to 960 is set. In the case of FIG. 3A, a gradation range of 64 to 960 is to be used for HDR display but the gradation ranges of 0 to 64 and 960 to 1023 are not to be used for the HDR display. In HDR display, gradation values of 0 to 64 are displayed in black (blocked-up shadow) and gradation values of 960 to 1023 are displayed in white (blown-out highlights). From the perspective of HDR display (whether or not HDR display is too bright and the like), a ratio of the number of pixels of blocked-up shadows (gradation values from 0 to 64) and a ratio of the number of pixels of blown-out highlights (gradation values from 960 to 1023) need not be managed. Therefore, preferably, brightness of blocked-up shadows in HDR display is handled as a brightness (0 cd/m$^2$) of black in SDR and HDR, brightness of blown-out highlights in HDR display is handled as a brightness (1000 cd/m$^2$) of white in HDR, and various ratios are managed accordingly. Examples of ratios that are preferably managed from the perspective of HDR display include a ratio of the number of pixels corresponding to SDR in an HDR image, a ratio of the number of pixels corresponding to non-SDR (a brightness range obtained by excluding SDR from HDR) in the HDR image, and the like.

When performing the HDR/SDR conversion shown in FIG. 2, respective ratios are preferably managed by handling a brightness range corresponding to a gradation range of 0 to 720 (a brightness range of 0 to 203 cd/m$^2$; a high reproduction range) as SDR In addition, respective ratios are preferably managed by handling a brightness range corresponding to a gradation range of 721 to 1023 (a brightness range of 203 to 1000 cd/m$^2$) as non-SDR. Furthermore, in non-SDR, a ratio of the number of corresponding pixels in the HDR image is preferably managed with respect to each of a brightness range (a low reproduction range) of 203 to 600 cd/m$^2$) and a brightness range (a non-reproduction range) of 600 to 1000 cd/m$^2$).

FIG. 3B shows an example of a case where a gradation value of the HDR image is a 10-bit value (0 to 1023), HLG (an original range of 0 to 1000 cd/m$^2$) is set, a limited range of 64 to 960 is set, and an HDR range of 0 to 700 cd/m$^2$ is set. In the case of FIG. 3B, brightness outside of the HDR range (0 to 700 cd/m$^2$) is not used for HDR display despite being included in an original range (0 to 1000 cd/m$^2$) of HLG. Specifically, a brightness range of 700 to 1000 cd/m$^2$ is not used for HDR display despite being included in the original range. In HDR display, brightness of 700 to 1000 cd/m$^2$ in the original range is displayed in white (blown-out highlights). However, in the case of FIG. 3B, brightness of white in HDR is 700 cd/m$^2$. From the perspective of HDR display, a ratio of the number of pixels corresponding to a brightness range which is included in the original range and which is not used for HDR display in the HDR image is preferably managed even though the ratio represents the number of pixels of blown-out highlights. FIG. 3B follows FIG. 3A in the other respects.

Assist functions for confirming a brightness distribution (a brightness level distribution) of an image include a false color display function (display method) of displaying an image after performing a process of converting a color of a pixel into a conversion color in accordance with a brightness of the pixel. In the present embodiment, the display control unit 106 can also set whether to enable or disable the false color display function to the image processing unit 103. When the false color display function is enabled, the image processing unit 103 is notified of a correspondence relationship between a brightness (a brightness range) and conversion color from the display control unit 106. The image processing unit 103 converts a color of a pixel in the object moving image data to a conversion color in accordance with the notified correspondence relationship (a color conversion process).

The graphic combining unit 104 generates combined moving image data by combining graphic data output from the graphic generating unit 108 with processed moving image data (each piece of frame image data) output from the image processing unit 103. In addition, the graphic combining unit 104 outputs the combined moving image data to the display unit 105. When graphic data is not output from the graphic generating unit 108, the graphic combining unit 104 outputs the processed moving image data to the display unit 105. Graphic data is image data representing a graphic image such as an On Screen Display (OSD) image. Combined moving image data represents a moving image (a combined moving image) obtained by superimposing a graphic image on a processed moving image (a moving image represented by processed moving image data).

The display unit 105 displays a moving image on the basis of the moving image data (combined moving image data or processed moving image data) output from the graphic combining unit 104 on a display surface. The display unit 105 has a display panel. For example, the display unit 105 is a liquid crystal display unit having a liquid crystal panel and a backlight unit or an organic EL display panel.

The display control unit 106 controls processes of the respective blocks of the display apparatus 100. The memory unit 107 stores programs, parameters, and the like. For example, the display control unit 106 is an arithmetic processing circuit that executes programs stored in the memory unit 107 and controls processes of the respective blocks of the display apparatus 100. Alternatively, the display control unit 106 may acquire, in response to an operation (a user operation) performed by the user with respect to button (not shown) provided on the display apparatus 100, operation information corresponding to the performed user operation. In addition, the display control unit 106 may perform switching of control, detailed setting of control and the like in accordance with the operation information.

In the present embodiment, the display control unit 106 controls processes of the image processing unit 103, the graphic generating unit 108, and the like on the basis of an analysis result (pixel information) output from the image analyzing unit 102, a user operation performed with respect to the display apparatus 100, and the like. Specifically, in accordance with a user operation (operation information), the display control unit 106 determines setting information of a gradation curve, a gradation range, an HDR range, execution of HDR/SDR conversion, enabling or disabling of the false color display function, and the like. In addition, the display control unit 106 outputs (sets) the determined setting information to the image processing unit 103. Furthermore, the display control unit 106 outputs (sets) the determined setting information and the analysis result output from the image analyzing unit 102 to the graphic generating unit 108. It should be noted that, immediately after the display apparatus 100 starts up, initial information (predetermined information) of setting information is set or a previous setting is carried over.

The graphic generating unit 108 generates graphic data and outputs the graphic data to the graphic combining unit 104. In the present embodiment, the graphic generating unit 108 determines a ratio of the number of corresponding pixels in an HDR image with respect to at least one of SDR and non-SDR on the basis of the analysis result (pixel information) and the setting information output from the display control unit 106. In addition, the graphic generating unit 108 generates graphic data indicating the determined ratio. The graphic generating unit 108 can also determine a ratio of correspondence with a brightness range that differs from both SDR and non-SDR. When various parameters (such as a gradation curve) indicated by setting information are acquired from object moving image data, metadata of the object moving image data, and the like or determined in advance, the graphic generating unit 108 can generate graphic data without using setting information. Furthermore, the graphic generating unit 108 may output the determined ratio, the generated graphic data, or the like to the external apparatus. The generation and combining of graphic data may be performed by the external apparatus. Output (display) of the ratio (the ratio of the number of pixels corresponding to a brightness range which constitutes a part of HDR and which includes a plurality of brightnesses) described above enables the user to readily (intuitively) assess the ratio.

FIGS. 4A to 4C show an example of a graphic image generated by the graphic generating unit 108. FIGS. 4A to 4C show an example of a case where HLG (an original range of 0 to 1000 cd/m$^2$) is set.

The graphic image shown in FIG. 4A includes, drawn as character strings (numerical values), a ratio (70%) of the number of pixels corresponding to SDR (a high reproduction range) in an HDR image and a ratio (30%) of the number of pixels corresponding to non-SDR in the HDR image. From these ratios, for example, the user can readily (intuitively) determine a brightness of the HDR image in HDR display, whether or not the number of pixels corresponding to non-SDR is too large (whether or not an area corresponding to non-SDR is too large), whether or not the HDR display of the HDR image is too bright, and the like. The user can also readily (intuitively) determine a degree of image quality deterioration due to HDR/SDR conversion. For example, the user can readily (intuitively) determine a size, a ratio, and the like of an area in an SDR image in which the HDR image is reproduced with a high degree of reproducibility. Furthermore, the graphic image shown in FIG. 4A includes, drawn as character strings, a ratio (25%) of the number of pixels corresponding to a low reproduction range in the HDR image and a ratio (5%) of the number of pixels corresponding to a non-reproduction range in the HDR image. From these ratios, the user can determine the degree of image quality deterioration due to HDR/SDR conversion in greater detail. For example, the user can readily (intuitively) determine a number of blown-out highlights that are created due to HDR/SDR conversion.

The graphic image shown in FIG. 4B also includes, drawn as character strings, ratios of the number of corresponding pixels with respect to both SDR and non-SDR in the HDR image. In addition, the graphic image shown in FIG. 4B includes, drawn as character strings, ratios of the number of corresponding pixels with respect to each of a plurality of brightness ranges in non-SDR in the HDR image. Specifically, ratios of the number of corresponding pixels in the HDR image are drawn as character strings with respect to each of four brightness ranges including 203 to 400 cd/m$^2$, 400 to 600 cd/m$^2$, 600 to 800 cd/m$^2$, and 800 to 1000 cd/m$^2$. From these ratios, for example, the user can readily manage the brightness of the HDR image in widths of approximately 200 cd/m$^2$. The user can also readily (intuitively) determine image quality of the HDR image (HDR display) on each of a display apparatus corresponding to DisplayHDR 400, a display apparatus corresponding to DisplayHDR 600, and a display apparatus corresponding to DisplayHDR 1000.

While a plurality of brightness ranges constituting non-SDR are used as a plurality of brightness ranges in non-SDR in FIGS. 4A and 4B, the plurality of brightness ranges need not constitute non-SDR. For example, any one of the plurality of brightness ranges in non-SDR may overlap with any of the other brightness ranges among the plurality of brightness ranges. Any one of the plurality of brightness ranges in non-SDR may be separated from any of the other brightness ranges among the plurality of brightness ranges. The plurality of brightness ranges in non-SDR may be a plurality of brightness ranges which a plurality of conversion colors of the false color display function are associated with.

The graphic image shown in FIG. 4C includes, drawn as character strings, ratios of the number of corresponding pixels only with respect to each of SDR and non-SDR in the HDR image. It should be noted that one of the ratio of the number of pixels corresponding to SDR in an HDR image and the ratio of the number of pixels corresponding to non-SDR in the HDR image enables the other to be determined therefrom. Therefore, the graphic image may only show one of the ratio of the number of pixels corresponding to SDR in an HDR image and the ratio of the number of pixels corresponding to non-SDR in the HDR image.

Figure 5A:
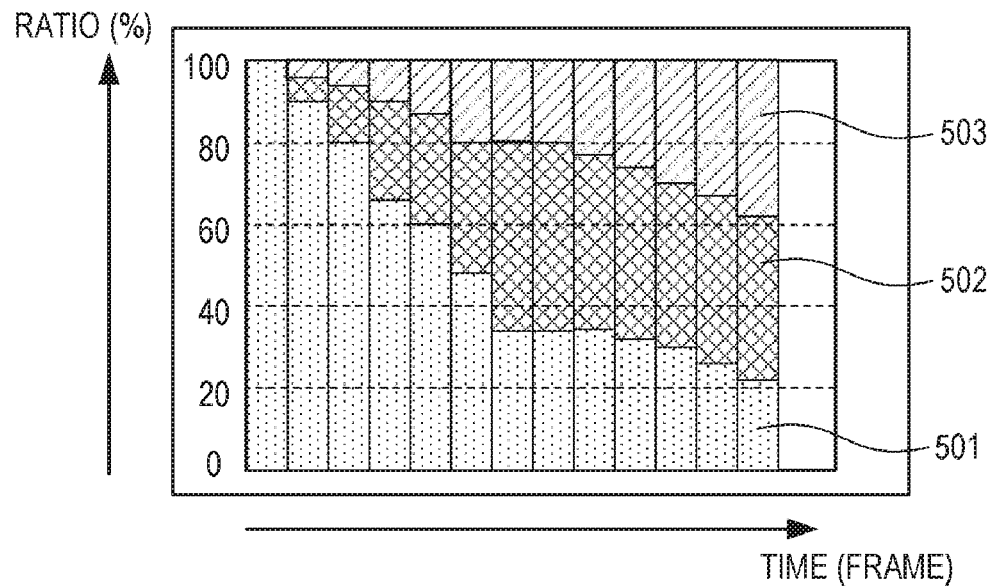
FIGS. 5A and 5B are diagrams showing an example of a graphic image according to the present embodiment.
Figure 5B:
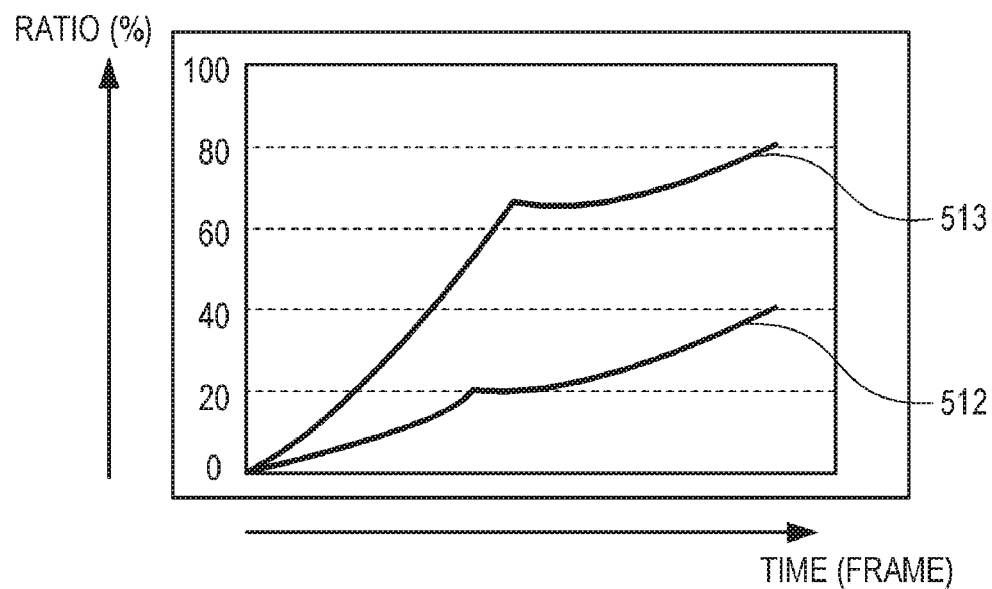

FIGS. 5A and 5B show another example of a graphic image. The graphic image in FIGS. 5A and 5B shows a time variation of various ratios in an object moving image. Specifically, graphs having an ordinate indicating a ratio and an abscissa indicating time are drawn on the graphic image shown in FIGS. 5A and 5B. In addition, the graphs drawn on the graphic image show a time variation of the various ratios. FIGS. 5A and 5B represent an example in which a ratio corresponding to SDR (a ratio of the number of pixels corresponding to SDR in an HDR image) gradually decreases from 100% and, at the same time, a ratio corresponding to non-SDR gradually increases from 0%.

In the graphic image shown in FIG. 5A, a bar graph indicates a time variation of various ratios. In FIG. 5A, a region 501 of the bar graph indicates a ratio corresponding to SDR (a high reproduction range), a region 502 indicates a ratio corresponding to a low reproduction range, and a region 503 indicates a ratio corresponding to a non-reproduction range. By checking the graphic image shown in FIG. 5A, the user can readily (intuitively) determine whether or not a state where there is a large number of pixels corresponding to non-SDR has continued and HDR display is too bright, whether or not the number of pixels corresponding to non-SDR instantaneously increases but brightness of the entire object moving image is subdued, and the like.

In the graphic image shown in FIG. 5B, a line graph indicates a time variation of various ratios. In FIG. 5B, a line 512 of the line graph indicates a ratio corresponding to the low reproduction range and a line 513 indicates a ratio corresponding to non-SDR including a non-reproduction range and a low reproduction range. The line 512 and the line 513 may be displayed in different colors. According to the graphic image shown in FIG. 5B, the user can more readily (more intuitively) determine a time variation of a ratio corresponding to the low reproduction range, a time variation of a ratio corresponding to the non-reproduction range, and the like as compared to the case of the graphic image shown in FIG. 5A. In addition, the user can more readily (more intuitively) determine whether or not non-SDR is used in an HDR image (whether or not pixels corresponding to non-SDR are present), whether or not the number of pixels corresponding to non-SDR is too large, and the like. A line indicating a ratio corresponding to SDR (a high reproduction range) is not drawn on the graphic image (the line graph) shown in FIG. 5B. However, since the ratio corresponding to SDR is obtained by subtracting the ratio indicated by the line 512 and the ratio indicated by the line 513 from 100%, the user can also readily determine a ratio corresponding to SDR.

Figures 6, 7:
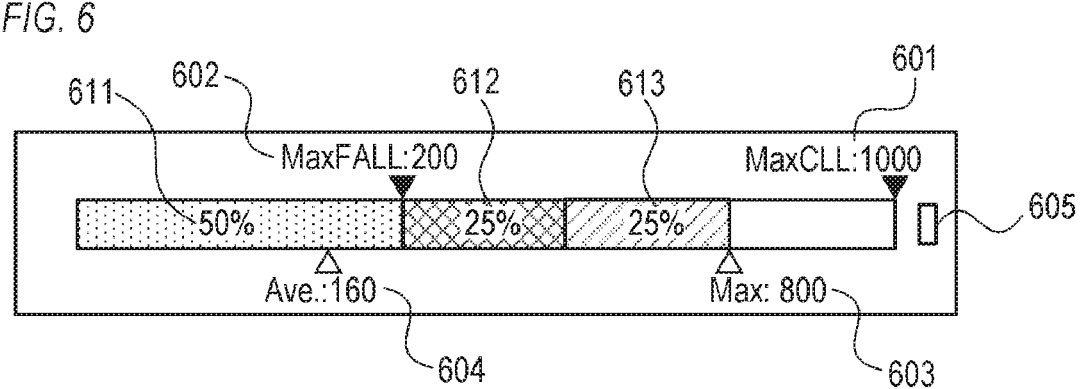
FIG. 6 is a diagram showing an example of a graphic image according to the present embodiment.
FIG. 7 is a diagram showing an example of setting information according to the present embodiment.

FIG. 6 shows another example of a graphic image. A bar (an indicator; a level meter) indicating various brightness ranges is drawn on the graphic image shown in FIG. 6. In the graphic image shown in FIG. 6, character strings indicating various brightnesses are drawn at positions representing the brightnesses indicated by the character strings among a plurality of positions of the bar. In addition, in the graphic image shown in FIG. 6, character strings indicating various ratios are drawn at positions representing brightness ranges corresponding to ratios indicated by the character strings among a plurality of positions of the bar.

In FIG. 6, a character string 603 indicates a peak brightness (a frame peak brightness; a maximum brightness, a maximum brightness level; a peak brightness level) of a frame image being displayed. A character string 604 indicates an average brightness (a frame average brightness; an average brightness level) of the frame image being displayed. The frame peak brightness, the frame average brightness, and the like can be obtained by analyzing metadata (metadata specified by HDR10, ST 2094-40, or the like) contained in HDMI data or the like. These pieces of information can also be obtained by analyzing the frame image (frame image data) being displayed itself. In the example shown in FIG. 6, the frame peak brightness is 800 cd/m$^2$ and the frame average brightness is 160 cd/m$^2$.

A character string 601 indicates a peak brightness of an object moving image (a moving image peak brightness; MaxCLL (Maximum Content Light Level)). A character string 602 indicates a maximum frame average brightness (MaxFALL (Maximum Frame Average Light Level)). The maximum frame average brightness represents a maximum brightness (a maximum level) among a plurality of frame average brightnesses respectively corresponding to a plurality of frames of the object moving image. These pieces of information can also be obtained by analyzing the metadata, the object moving image data itself, or the like. In the example shown in FIG. 6, the moving image peak brightness is 1000 cd/m$^2$ and the maximum frame average brightness is 200 cd/m$^2$.

It should be noted that at least one of the moving image peak brightness and the maximum frame average brightness may be brightness designated (set) in advance by the user. At least one of the moving image peak brightness and the maximum frame average brightness may be added in advance as meta information to a moving image file of the object moving image. The moving image peak brightness may be a peak brightness of the entire object moving image or a peak brightness of a partial period of the object moving image such as a display period of a graphic image. In a similar manner, the maximum frame average brightness may be a maximum brightness among all frame average brightnesses of the object moving image or a maximum brightness among a plurality of frame average brightnesses in a partial period of the object moving image.

The moving image maximum peak brightness indicated by metadata, the moving image maximum peak brightness designated by the user, or the like may differ from an actual peak brightness of an object moving image. Therefore, a frame peak brightness (an actual peak brightness of a frame image) may exceed the moving image maximum peak brightness indicated by the character string 601 (the moving image maximum peak brightness indicated by metadata, the moving image maximum peak brightness designated by the user, and the like). For this reason, an item 605 for notifying (warning) that the frame peak brightness indicated by the character string 603 (the actual peak brightness of the frame image being displayed) has exceeded the moving image maximum peak brightness indicated by the character string 601 is drawn on the graphic image shown in FIG. 6. The graphic generating unit 108 changes a display mode of the item 605 when the frame peak brightness indicated by the character string 603 exceeds the moving image maximum peak brightness indicated by the character string 601.

A character string 611 indicates a ratio corresponding to SDR (a high reproduction range), a character string 612 indicates a ratio corresponding to a low reproduction range, and a character string 613 indicates a ratio corresponding to a non-reproduction range.

Enabling/disabling drawing of a ratio, a type of the ratio to be drawn, and the like can be switched in accordance with a user operation with respect to the display apparatus 100 or the like.

FIG. 7 is a table showing an example of setting information related to generation of a graphic image according to the present embodiment. In the example shown in FIG. 7, "ON" for displaying a ratio or "OFF" for not displaying a ratio is set as setting information of a setting item "ratio display". Any of "HDR/SDR conversion", "false color", and "HDR/SDR ratio" is set as setting information of a setting item "ratio display type". "HDR/SDR conversion" is setting information for displaying a ratio on the basis of HDR/SDR conversion. "False color" is setting information for displaying a ratio on the basis of the false color display function (a color conversion process). "HDR/SDR ratio" is setting information for displaying only a ratio corresponding to SDR and a ratio corresponding to non-SDR. As setting information of a setting item "HDR/SDR border", either "automatic" for automatically determining a brightness (a boundary brightness) that constitutes a boundary between SDR and non-SDR or a manually-designated boundary brightness is set. For example, 100 cd/m$^2$ or 203 cd/m$^2$ may be designated by a user operation as the boundary brightness or an arbitrary value from 100 to 203 cd/m$^2$ may be designated by a user operation as the boundary brightness. When "automatic" is set, the graphic generating unit 108 automatically determines a boundary brightness on the basis of a gradation conversion curve (conversion characteristics) of HDR/SDR conversion, the false color display function (a color conversion process), image data standards (such as PQ and HLG), or the like. The display control unit 106 sets these pieces of setting information to the graphic generating unit 108 in accordance with a user operation (operation information) with respect to the display apparatus 100 or the like.

Figures 8, 9:
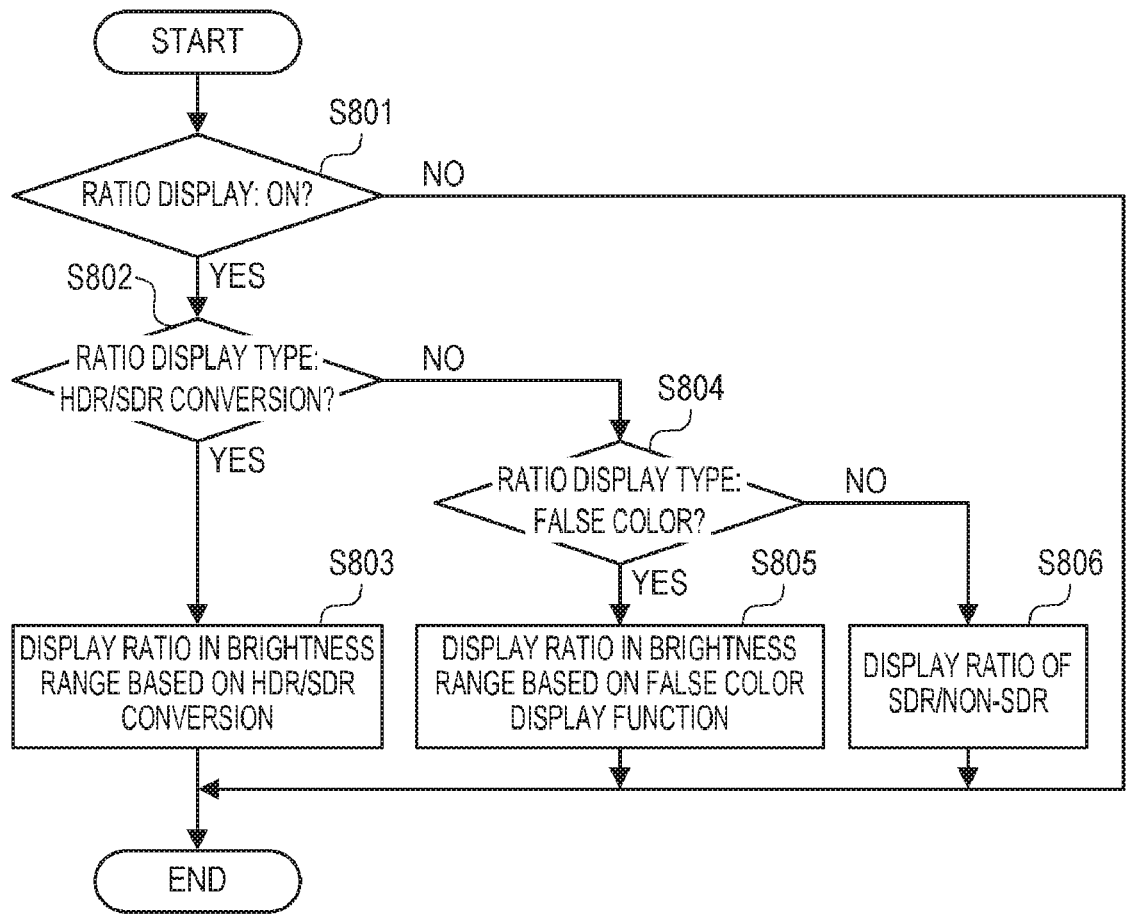
FIG. 8 is a flow chart showing an example of a process flow of the display apparatus according to the present embodiment.
FIG. 9 is a diagram showing an example of a correspondence relationship among a gradation value, the number of pixels, and brightness according to the present embodiment.

FIG. 8 is a flow chart showing an example of a process flow of the display apparatus 100. For example, the process flow shown in FIG. 8 starts when, in a state where an object moving image has been input to the display apparatus 100 (a state where various ratios can be determined), a frame image acquired by the input unit 101 is updated and the graphic generating unit 108 is notified of an analysis result of the image analyzing unit 102. The process flow shown in FIG. 8 also starts when setting information such as a gradation curve, a gradation range, an HDR range, enabling/disabling of the false color function, or the like is updated by a user operation and the graphic generating unit 108 is notified of the updated setting information.

In step S801, the graphic generating unit 108 determines whether or not "ON" is set as setting information of the setting item "ratio display" shown in FIG. 7. When "ON" is set, the process advances to step S802. When "OFF" is set, a graphic image indicating the various ratios is not displayed and the present process flow ends.

In step S802, the graphic generating unit 108 determines whether or not "H-DR/SDR conversion" is set as setting information of the setting item "ratio display type" shown in FIG. 7. When "HDR/SDR conversion" is set, the process advances to step S803, but when "HDR/SDR conversion" is not set, the process advances to step S804.

In step S803, the graphic generating unit 108 determines brightness ranges (SDR (a high reproduction range), a low reproduction range, and a non-reproduction range) on the basis of HDR/SDR conversion. In addition, on the basis of pixel information of an object frame image, the graphic generating unit 108 determines a ratio of the number of pixels corresponding to the determined brightness ranges in the object frame image. The object frame image is a frame image that is a processing object and a frame image which is output from the image analyzing unit 102 to be displayed. Subsequently, the graphic generating unit 108 generates a graphic image indicating the determined ratio and outputs the generated graphic image to the graphic combining unit 104. The graphic generating unit 108 may further determine a frame peak brightness of the object frame image, a frame average brightness of the object frame image, a moving image peak brightness of an object moving image, a maximum frame average brightness of the object moving image, and the like and generate a graphic image further indicating such brightnesses. According to the process of step S803, a graphic image such as those shown in FIGS. 4A, 5A, 5B, and 6 is generated and displayed.

A specific example of a determination method of various brightnesses and various ratios will now be described.

The graphic generating unit 108 converts each gradation value of object frame image data into a brightness on the basis of an analysis result (pixel information) and setting information (a gradation curve and a gradation range) output from the display control unit 106.

FIG. 9 shows an example of pixel information (a correspondence relationship between a gradation value and the number of pixels), and a correspondence relationship between the gradation value and a brightness after conversion. FIG. 9 shows an example in which a resolution (the number of pixels in a horizontal direction×the number of pixels in a vertical direction) of an object frame image is 1920×1080 pixels or, in other words, a total number of pixels in the object frame image is 2,073,600 pixels. FIG. 9 represents an example of a case where a gradation value of the object frame image is a 10-bit value (0 to 1023). In FIG. 9, the number of pixels having a gradation value of 940 is 1,036,800 pixels and the number of pixels having a gradation value of 64 is 1,036,800 pixels.

In this case, it is assumed that HLG is set as a gradation curve and a gradation range of 64 to 940 is set as a limited range. Therefore, the graphic generating unit 108 converts the gradation range of 64 to 940 into a brightness range of HLG (a brightness range of 0 to 1000 cd/m). In the gradation range of 64 to 940, a variation in brightness with respect to a variation in a gradation value conforms to HLG In addition, the graphic generating unit 108 converts a gradation value smaller than 64 into 0 cd/m$^2$, and converts a gradation value larger than 940 into 1000 cd/m$^2$ (a clipping process).

A plurality of tables such as that shown in FIG. 9 (a plurality of tables corresponding to a plurality of combinations of any of a plurality of gradation curves and any of a plurality of gradation ranges) may be prepared in advance, whereby the conversion described above may be performed using a table in accordance with setting information of the gradation curve and the gradation range. The conversion described above may be performed by a calculation using a calculation formula in accordance with setting information of the gradation curve and the gradation range among a plurality of calculation formulas corresponding to the plurality of combinations described above.

While a brightness range of 0 to 1000 cd/m$^2$ was used as the brightness range of HLG in FIG. 9, a brightness specified in HLG is a relative brightness and the brightness range (a range of absolute brightness) of HLG can be changed. For example, the brightness range of HLG can be changed to a brightness range of 0 to 2000 cd/m$^2$ or the like. When the brightness range of HLG changes, a correspondence relationship between a gradation value and a brightness after conversion also changes.

After the conversion described above, the graphic generating unit 108 determines, from pixel information, a largest gradation value at which a pixel is present. In addition, the graphic generating unit 108 determines a brightness corresponding to the determined gradation value (the brightness after the conversion described above) as a frame peak brightness. In the example shown in FIG. 9, the largest gradation value at which a pixel is present is 940 and, due to the conversion described above, the gradation value of 940 has been converted into a brightness of 1000 $cd/m^2$. Therefore, 1000 $cd/m^2$ is determined as the frame peak brightness.

Furthermore, the graphic generating unit 108 calculates a product of the number of pixels and the brightness after conversion (number of pixels×brightness) for each gradation value, and calculates a sum of the calculation results (multiplication values). Accordingly, a sum of brightnesses of all pixels is obtained. In addition, the graphic generating unit 108 calculates a frame average brightness by dividing the sum of brightnesses of all pixels by the total number of pixels (sum of brightnesses of all pixels/total number of pixels). In the example shown in FIG. 9, from "(1,036,800 pixels×1000 $cd/m^2$+1,036,800 pixels×0 $cd/m^2$)/2,073,600 pixels", 500 $cd/m^2$ is calculated as the frame average brightness.

By performing the process described above with respect to each of a plurality of frames of an object moving image, a moving image peak brightness and a maximum frame average brightness can be determined from a plurality of processing results respectively corresponding to the plurality of frames. Specifically, a maximum brightness of a plurality of frame peak brightnesses can be determined as the moving image peak brightness, and a maximum brightness of a plurality of frame average brightnesses can be determined as the maximum frame average brightness.

This concludes the description of a specific example of the determination method of various brightnesses. Next, a specific example of a determination method of various ratios will be described.

Let us assume that the curve shown in FIG. 2 is set as a gradation conversion curve (conversion characteristics) of HDR/SDR conversion. Therefore, in accordance with the curve shown in FIG. 2, the graphic generating unit 108 determines a brightness range of 0 to 203 $cd/m^2$ as SDR (a high reproduction range). In addition, the graphic generating unit 108 determines a brightness range of 203 to 600 $cd/m^2$ as a low reproduction range and a brightness range that is higher than 600 $cd/m^2$ as a non-reproduction range.

Subsequently, the graphic generating unit 108 determines the number of pixels converted into a brightness belonging to the determined brightness ranges described above and calculates a ratio corresponding to the determined brightness ranges described above by dividing the determined number of pixels by the total number of pixels of the object frame image. In the example shown in FIG. 9, the pixels converted to 0 to 203 $cd/m^2$ are pixels with the gradation value of 64 (1,036,800 pixels). Therefore, from "(1,036,800 pixels/2,073,600 pixels)×100%", 50% is calculated as the ratio corresponding to SDR. In a similar manner, 0% is calculated as the ratio corresponding to the low reproduction range and 50% is calculated as the ratio corresponding to the non-reproduction range.

Let us now return to the description of FIG. 8. In step S804, the graphic generating unit 108 determines whether or not "false color" is set as setting information of the setting item "ratio display type" shown in FIG. 7. When "false color" is set, the process advances to step S805, but when "false color" is not set (when "HDR/SDR ratio" is set), the process advances to step S806.

In step S805, the graphic generating unit 108 determines a brightness range on the basis of the false color display function (a color conversion process). Specifically, the graphic generating unit 108 determines a plurality of brightness ranges which a plurality of conversion colors of the false color display function are associated with. Let us now assume that, in the false color display function, monochrome is associated as a conversion color with the brightness range of 0 to 203 $cd/m^2$ (SDR). In addition, let us assume that four conversion colors (non-monochrome colors) are respectively associated with four brightness ranges (non-SDR) of 203 to 400 $cd/m^2$, 400 to 600 $cd/m^2$, 600 to 800 $cd/m^2$, and 800 to 1000 $cd/m^2$. In this case, the graphic generating unit 108 determines five brightness ranges of 0 to 203 $cd/m^2$, 203 to 400 $cd/m^2$, 400 to 600 $cd/m^2$, 600 to 800 $cd/m^2$, and 800 to 1000 $cd/m^2$. In addition, on the basis of pixel information of an object frame image, the graphic generating unit 108 determines a ratio of the number of pixels corresponding to the determined brightness ranges in the object frame image. The determination method of the ratio is as described earlier. Subsequently, the graphic generating unit 108 generates a graphic image indicating the determined ratio and outputs the generated graphic image to the graphic combining unit 104. According to the process of step S805, a graphic image such as that shown in FIG. 4B is generated and displayed.

In step S806, the graphic generating unit 108 determines only a ratio corresponding to SDR and a ratio corresponding to non-SDR. The determination method of the ratios is as described earlier. Let us now consider a case where "automatic" is set as the setting information of the setting item "HDR/SDR border" shown in FIG. 7. In this case, the graphic generating unit 108 determines brightness ranges (SDR and HDR) on the basis of standards (set gradation curves; HLG PQ, or the like) related to a dynamic range of an object moving image (an object frame image) and determines ratios corresponding to the determined brightness ranges. For example, in the case of HLG the graphic generating unit 108 determines a brightness range of 203 $cd/m^2$ or lower as SDR and a brightness range that is higher than 203 $cd/m^2$ as non-SDR. In the case of PQ, the graphic generating unit 108 determines a brightness range of 100 $cd/m^2$ or lower as SDR and a brightness range that is higher than 100 $cd/m^2$ as non-SDR. The graphic generating unit 108 may determine SDR and non-SDR on the basis of HDR/SDR conversion, the false color display function, and the like. Next, let us consider a case where a boundary brightness (a manually-designated brightness) is set as the setting information of the setting item "HDR/SDR border" shown in FIG. 7. In this case, the graphic generating unit 108 determines a brightness range equal to or lower than the boundary brightness as SDR and a brightness range that is higher than the boundary brightness as non-SDR. Subsequently, the graphic generating unit 108 generates a graphic image indicating the determined ratios and outputs the generated graphic image to the graphic combining unit 104. According to the process of step S806, a graphic image such as that shown in FIG. 4C is generated and displayed.

While an example has been described in which a graphic image is updated every frame by drawing (updating or adding) a ratio, a frame peak brightness, a frame average brightness, or the like every frame, this example is not mandatory. For example, a graphic image may be updated every two frames by drawing (updating or adding) a ratio, a frame peak brightness, a frame average brightness, or the like every two frames. Accordingly, an update frequency of graphic images, a drawing amount of information, and the like can be reduced. In this case, a ratio, a frame peak brightness, a frame average brightness, or the like may be decimated every two frames. In other words, a ratio, a frame peak brightness, a frame average brightness, or the like may be information corresponding to one frame. A ratio, a frame peak brightness, a frame average brightness, or the like may be an average of pieces of information of two frames.

While an example of analyzing 10-bit object moving image data at an accuracy of 10 bits has been described, 10-bit object moving image data may be analyzed at a lower accuracy than 10 bits. For example, the number of pixels of gradation values 0 to 3, the number of pixels of gradation values 4 to 6, and the like may be counted at an accuracy of 8 bits.

While an example of using an absolute brightness as a brightness level has been described, the brightness level is not limited to an absolute brightness. For example, a gradation value may be used as the brightness level. In this case, instead of converting a gradation value into a brightness, a peak gradation value (a maximum gradation value) of a frame image may be determined as a frame peak brightness and an average gradation value "APL (Average Picture Level)" of the frame image may be determined as a frame average brightness. Types of brightness levels may be switched as appropriate. When settings are in place for processing an HDR image (for example, when a gradation curve of HLG, PQ, or the like is set), absolute brightness may be used as a brightness level. In addition, when settings are in place for processing an SDR image (for example, when a gradation curve of Gamma 2.2 or the like is set), a gradation value may be used as a brightness level.

While an example has been described in which frame image data is acquired every frame and a graphic image is updated every frame, this example is not mandatory. For example, a moving image file (an entire piece of object moving image data) may be acquired, all pieces of frame image data may be analyzed, and a graphic image on which a ratio of all of the pieces of frame image data (a ratio of the number of pixels corresponding to a brightness range in frame images) can be generated in one go. Only one moving image file may be acquired or a plurality of moving image files to be sequentially reproduced may be acquired. When a plurality of moving image files are acquired, a graphic image indicating the ratio described above of the plurality of moving image files may be generated.

Figure 10:
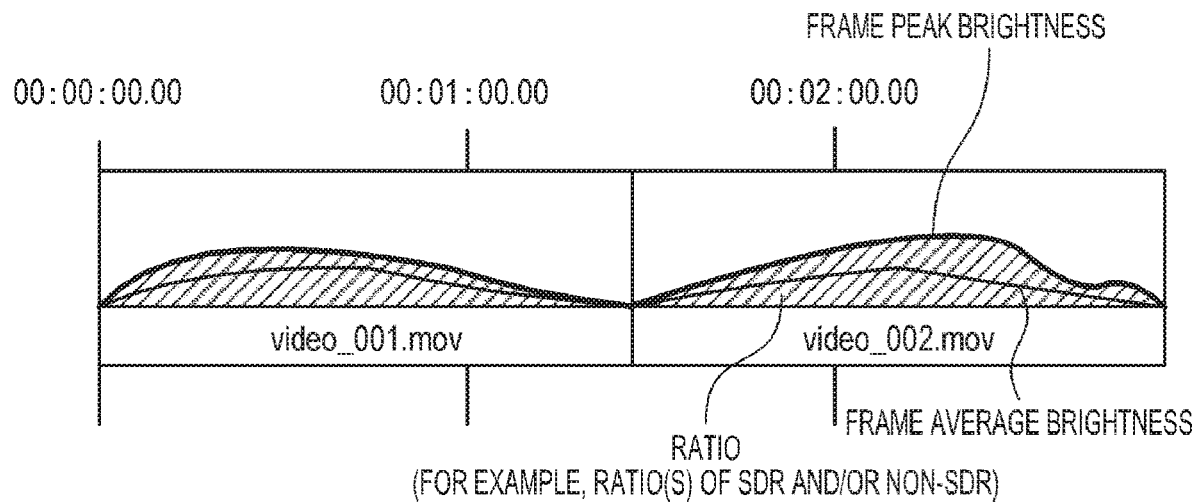
FIG. 10 is a diagram showing an example of a graphic image according to the present embodiment.

FIG. 10 shows an example of a graphic image generated on the basis of a moving image file. FIG. 10 represents an example of a case where two moving image files having file names of "video_001.mov" and "video_002.mov" are successively reproduced. In FIG. 10, the file names of the two moving image files are drawn on a time axis (a time line). In addition, time variations of a frame peak brightness, a frame average brightness, and a ratio (for example, a ratio of SDR and/or non-SDR as shown in FIGS. 5A and 5B) of the two moving image files are shown. Displaying such a graphic image enables the user to check time variations of the ratio described above and the like in a plurality of moving images and readily (intuitively) assess whether or not the plurality of moving image files are switched in a visually suitable manner or the like when the moving images are successively reproduced. Accordingly, the user can suitably edit each moving image file (efficiency of editing is improved). The plurality of moving image files are, for example, a plurality of moving image files that are expected to be connected to create one moving image file.

While an example of analyzing object moving image data to acquire pixel information has been described, this example is not mandatory. When pixel information is contained in metadata corresponding to object moving image data, the pixel information may be acquired by analyzing the metadata. In this case, the metadata may be metadata added to the object moving image data (metadata contained in the object moving image data) or metadata (a metafile) independent of the object moving image data.

Figure 11:
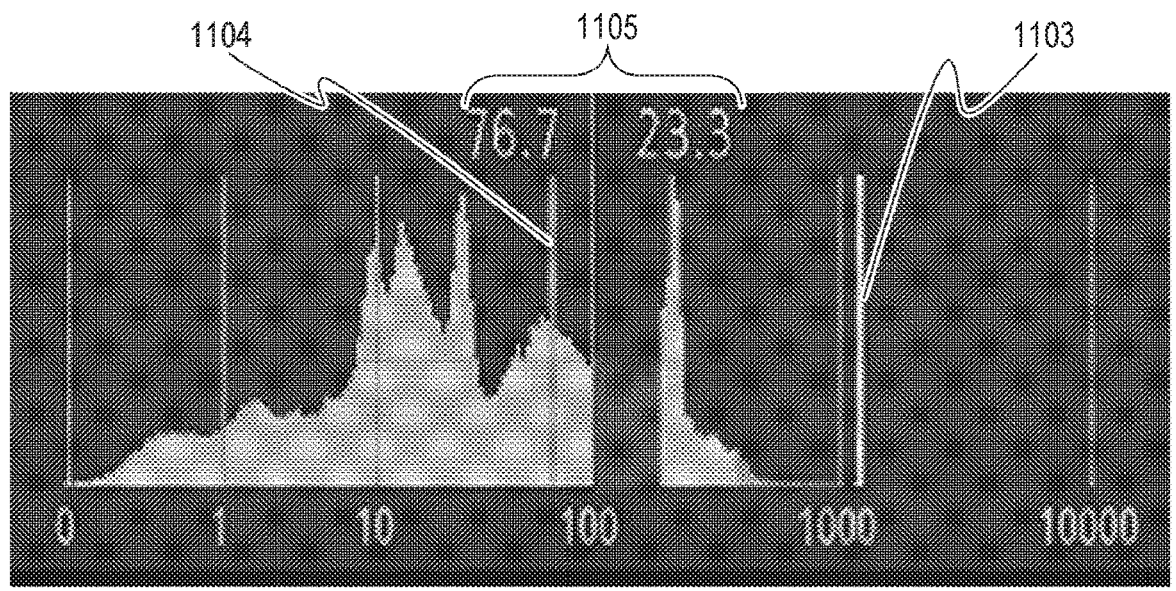
FIG. 11 is a diagram showing an example of a graphic image according to the present embodiment.

In addition, while graphic images are exemplified in FIGS. 4A to 4C, 5A, 5B, 6, and 10, other graphic images may be used or a combination of the graphic images shown in FIGS. 4A to 4C, 5A, 5B, 6, and 10 may be used. Furthermore, the flow shown in FIG. 8 is merely an example and other flows may be used. For example, FIG. 11 is a diagram showing an example of a graphic image according to the present embodiment and represents a histogram of brightness in a frame image being displayed. An ordinate represents frequency (number of pixels) and an abscissa represents brightness and, in this case, a brightness scale on the basis of PQ instead of HLG is used. A line 1103 represents a peak brightness of the frame image being displayed, and a line 1104 represents an average brightness of the frame image being displayed. In addition, an HDR/SDR ratio 1105 is displayed alongside the histogram. Specifically, a ratio (76.7%) of the number of pixels corresponding to SDR is drawn as a character string on the side of SDR of the histogram, and a ratio (23.3%) of the number of pixels corresponding to non-SDR is drawn as a character string on the side of non-SDR of the histogram. Accordingly, the user can readily (intuitively) assess the ratio of the number of pixels corresponding to SDR and the ratio of the number of pixels corresponding to non-SDR. It should be noted that a boundary brightness of an HDR/SDR border is set to 100 cd/m$^2$. In this case, it is assumed that, in the false color display function, monochrome is associated as a conversion color with the brightness range of 0 to 100 cd/m$^2$ (SDR). In addition, it is assumed that four different conversion colors (non-monochrome colors) are respectively associated with four brightness ranges (non-SDR) of 100 to 250 cd/m$^2$, 250 to 500 cd/m$^2$, 500 to 1000 cd/m$^2$, and 1000 to 10000 cd/m$^2$. Therefore, in FIG. 11, each bar (bin) of the histogram is colored in a conversion color corresponding to each brightness range. Accordingly, since both the frame image and the histogram displayed on a display surface are colored in false colors (conversion colors), the user can simultaneously visually confirm both a position of a region and a ratio of the number of pixels corresponding to a brightness range. In FIG. 11, the peak brightness 1103 of the frame image exceeds 1000 cd/m$^2$ that is a maximum brightness of a display range (a range of display brightness (brightness on the display surface); HDR range) of the display apparatus. In this case, each bar (bin) of the histogram in the exceeded region (outside of the display range) may be displayed in a warning color. It should be noted that settings of the false color display function may be applied to the graphic images shown in FIGS. 5A, 5B, and 6 to color the graphic images in false colors in a similar manner to the graphic image shown in FIG. 11.

As described above, according to the present embodiment, pixel information related to a brightness (a brightness level) of each pixel in an image is acquired. In addition, on the basis of the pixel information, a ratio of the number of corresponding pixels in the image is determined and output with respect to at least one of SDR and non-SDR. Accordingly, the user can readily (intuitively) assess at least one of the ratio of the number of pixels corresponding to SDR and the ratio of the number of pixels corresponding to non-SDR It should be noted that each block of the present embodiment (FIG. 1) may or may not be individual hardware. Functions of two or more blocks may be realized by common hardware. Each of a plurality of functions of one block may be realized by individual hardware. Two or more functions of one block may be realized by common hardware. In addition, each block may or may not be realized by hardware. For example, an apparatus may include a processor and a memory storing a control program. In addition, functions of at least a part of blocks included in the apparatus may be realized by having the processor read the control program from the memory and execute the control program.

It is to be understood that the present embodiment (including the modifications described above) are merely examples and that configurations obtained by appropriately modifying or altering the configurations of the present embodiment without departing from the spirit and scope of the present invention are also included in the present invention.

According to the present disclosure, a user can readily (intuitively) assess a ratio of the number of pixels corresponding to a brightness range which constitutes a part of HDR and which includes a plurality of brightness levels.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-051578, filed on Mar. 19, 2019, which is hereby incorporated by reference herein in its entirety.

What is claimed is:

1. An information processing apparatus comprising at least one memory and at least one processor which function as:
   an acquiring unit configured to acquire information related to a brightness level of each pixel in a frame image of a moving image;
   a generating unit configured to generate a graphic image; and
   an outputting unit configured to output the graphic image, wherein
   the generating unit:
   obtains, on a basis of the information, a ratio of a number of corresponding pixels to a number of all pixels in the frame image with respect to at least one of a brightness range of Standard Dynamic Range (SDR) and a brightness range obtained by excluding the brightness range of SDR from a brightness range of High Dynamic Range (HDR), and
   generates the graphic image indicating a time variation of the ratio in the moving image.

2. The information processing apparatus according to claim 1, wherein
   the generating unit obtains the ratio with respect to at least each of a plurality of sub-ranges obtained by dividing the brightness range obtained by excluding the brightness range of SDR from the brightness range of HDR.

3. The information processing apparatus according to claim 1, wherein
   the generating unit obtains, on a basis of a conversion process of converting a dynamic range of the frame image, a brightness range for determining the ratio.

4. The information processing apparatus according to claim 1, wherein
   the generating unit obtains, on a basis of a conversion process of converting a color of a pixel of the frame image in accordance with a brightness range to which a brightness level of the pixel belongs, a brightness range for determining the ratio.

5. The information processing apparatus according to claim 1, wherein
   the generating unit obtains, on a basis of a standard related to a dynamic range of the frame image, a brightness range for determining the ratio.

6. The information processing apparatus according to claim 1, wherein
   the acquiring unit acquires the information by analyzing metadata corresponding to the frame image.

7. A display apparatus comprising:
   a display module; and
   the information processing apparatus according to claim 1.

8. An information processing method comprising:
   acquiring information related to a brightness level of each pixel in a frame image of a moving image;
   generating a graphic image; and
   outputting the graphic image, wherein
   a ratio of a number of corresponding pixels to a number of all pixels in the frame image with respect to at least one of a brightness range of Standard Dynamic Range (SDR) and a brightness range obtained by excluding the brightness range of SDR from a brightness range of High Dynamic Range (HDR) is obtained on a basis of the information, and
   the graphic image indicating a time variation of the ratio in the moving image is generated.

9. A non-transitory computer readable medium that stores a program, wherein
the program causes a computer to execute an information processing method comprising:
acquiring information related to a brightness level of each pixel in a frame image of a moving image;
generating a graphic image; and
outputting the graphic image, wherein
a ratio of a number of corresponding pixels to a number of all pixels in the frame image with respect to at least one of a brightness range of Standard Dynamic Range (SDR) and a brightness range obtained by excluding the brightness range of SDR from a brightness range of High Dynamic Range (HDR) is obtained on a basis of the information, and
the graphic image indicating a time variation of the ratio in the moving image is generated.

10. The information processing apparatus according to claim 1, wherein
the generating unit generates the graphic image indicating an average brightness level of the frame image.

11. The information processing apparatus according to claim 1, wherein
in a case where a false color display function is enabled, the generating unit applies conversion colors to the graphic image on a basis of a predetermined relationship between a plurality of brightness ranges and a plurality of conversion colors.

12. The information processing apparatus according to claim 1, wherein
the outputting unit outputs a combined image generated by combining the graphic image with the frame image.

13. The information processing apparatus according to claim 1, wherein
the at least one memory and the at least one processor further function as an image processing unit configured to process the frame image, and
the outputting unit outputs the combined image generated by combining the graphic image with the frame image processed by the image processing unit.

14. The information processing apparatus according to claim 1, wherein
the brightness range of SDR is a brightness range of 203 $cd/m^2$ or lower, and
the brightness range obtained by excluding the brightness range of SDR from the brightness range of HDR is a brightness range higher than 203 $cd/m^2$.

15. The information processing apparatus according to claim 1, wherein the ratio is a percentage (%).

* * * * *